(12) United States Patent
Tu et al.

(10) Patent No.: US 8,565,907 B2
(45) Date of Patent: Oct. 22, 2013

(54) AUDIO MIXING DEVICE AND METHOD

(75) Inventors: Yi-Chang Tu, HsinChu (TW); Ming-Lih Lin, HsinChu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1064 days.

(21) Appl. No.: 12/506,702

(22) Filed: Jul. 21, 2009

(65) Prior Publication Data

US 2010/0036513 A1 Feb. 11, 2010

(30) Foreign Application Priority Data

Jul. 21, 2008 (TW) ................................ 97127705 A

(51) Int. Cl.
*G06F 17/00* (2006.01)
(52) U.S. Cl.
USPC ............................................ 700/94; 381/119
(58) Field of Classification Search
USPC .......................................................... 700/94
See application file for complete search history.

(56) References Cited

U.S. PATENT DOCUMENTS

| | | | | |
|---|---|---|---|---|
| 4,339,091 A * | 7/1982 | Enneking et al. | ........... | 242/361.3 |
| 5,647,008 A * | 7/1997 | Farhangi et al. | ............... | 381/119 |
| 5,809,004 A * | 9/1998 | Kobayashi et al. | ........ | 369/275.3 |
| 6,278,394 B1 | 8/2001 | May | | |
| 6,487,535 B1 * | 11/2002 | Smyth et al. | ................... | 704/500 |
| 6,591,391 B1 * | 7/2003 | Rowenhorst et al. | ......... | 714/756 |
| 6,867,721 B1 * | 3/2005 | Lin | ............................... | 341/144 |
| 7,158,843 B2 * | 1/2007 | Smith | ............................. | 700/94 |
| 7,230,557 B1 | 6/2007 | Burk et al. | | |
| 7,236,836 B1 * | 6/2007 | Tanaka et al. | .................... | 700/94 |
| 7,619,551 B1 * | 11/2009 | Wu | ................................ | 341/143 |
| 8,082,050 B2 * | 12/2011 | Schmidt et al. | ................. | 700/94 |
| 2004/0130471 A1 * | 7/2004 | Lee | ................ | 341/143 |
| 2004/0174279 A1 * | 9/2004 | Heo | ............................. | 341/106 |
| 2005/0185649 A1 * | 8/2005 | Ichimura et al. | .............. | 370/392 |
| 2006/0034365 A1 * | 2/2006 | Song et al. | .................... | 375/238 |
| 2007/0183455 A1 * | 8/2007 | Bruekers et al. | ............. | 370/493 |
| 2008/0247450 A1 * | 10/2008 | Alexander et al. | ............ | 375/224 |
| 2009/0060228 A1 * | 3/2009 | Chieng et al. | ................. | 381/120 |
| 2009/0326692 A1 * | 12/2009 | Lin et al. | ........................ | 700/94 |

FOREIGN PATENT DOCUMENTS

CN 1477900 2/2004

OTHER PUBLICATIONS

CN Office Action (Dated Aug. 1, 2012).
English Abstract translation of CN1477900 (Published Feb. 25, 2004).

* cited by examiner

*Primary Examiner* — Paul McCord
(74) *Attorney, Agent, or Firm* — McClure, Qualey & Rodack, LLP

(57) ABSTRACT

An audio mixing device and method are provided. The audio mixing device includes an analog to digital converter (ADC), a converting module, a mixing module, and a down-sample filter. The ADC is adapted to receive an analog signal, and convert the analog signal into a first digital signal. The converting module receives the second digital signal, and adjusts a data rate of the second digital signal according to a data rate of the first digital signal to generate a third digital signal. The mixing module mixes the first digital signal and the third digital signal to output a mixed signal. The down-sample filters down-samples the mixed to output a down-sampled signal.

20 Claims, 5 Drawing Sheets

AUDIO MIXING DEVICE AND METHOD

CROSS-REFERENCE TO RELATED APPLICATIONS

This non-provisional application claims priority under 35 U.S.C. §119(a) on Patent Application No(s). 97127705 filed in Taiwan, R.O.C. on Jul. 21, 2008, the entire contents of which are hereby incorporated by reference.

BACKGROUND

1. Technical field

The disclosure relates to an audio mixing device and method, and more particularly to a mixing device and method applied to an audio codec.

2. Background Art

An audio encoder/decoder (codec) can convert an analog audio signal (such as human voice and/or music sound), into a digital audio signal through an analog to digital converter (ADC), so as to transmit it to a subsequent stage device (such as a personal computer), for further audio processing.

In addition, the digital microphone is a device which has been used frequently in the field of audio processing in recent years. An ADC is built in the digital microphone, the digital microphone receives an analog audio signal, and the analog audio signal can be converted into a digital audio signal by the built-in ADC. This integration of elements saves space which can then be used to accommodate an external ADC, reducing the volume of related electronic elements and improving the capacity of the device to resist noise interference.

However, in order to improve the sound quality of a digital audio signal captured by a conventional external ADC or digital microphone, an over-sampling technology is usually used to capture the audio signal. The digital audio signal is then processed by a down sample filter to generate the output audio signal, so as to provide subsequent relevant applications. In this case, if the audio codec can receive the analog audio signal and the digital audio signal provided by the digital microphone, two down sample filters are needed to process audio signals from two different sources respectively. This increases the cost of the down sample filters.

U.S. Pat. No. 7,230,557B1 provides a solution to the problems described above. FIG. 1 is a schematic view of a conventional audio codec. The audio codec A1 includes: an ADC A10, a selecting module A30, and a down sample filter A40.

As shown in FIG. 1, the prior art uses the selecting module A30 to receive the digital audio signal transmitted by the ADC A10 and the digital audio signal transmitted by a digital microphone A20. A select signal is then used to select the output of the ADC A10 or the output of the digital microphone A20, and the selected output is transmitted to the down sample filter A40. Thus the audio codec Al can receive the digital audio signal transmitted by the digital microphone A20 at the same time as it receives the analog audio signal. The selecting module A30 selects the source to be transmitted to the down sample filter A40 as desired, so the additional down sample filter A40 is not needed, thereby reducing the cost of the circuit.

However, in actual application the user may need to mix the analog audio signal with the signal received and processed by the digital microphone in order to generate a mixed output signal. For example, in a live concert the background music is an analog audio signal, and a singer generates a digital audio signal through the digital microphone. In such cases, the analog background music and the digital audio signal of the singer must be combined and then output. In this case, since the above US patent can select and transmit only one output to the down sample filter for processing at a time because the selecting module is used, it is not capable of mixing the analog audio signal and the digital audio signal.

This is a problem that needs to be solved urgently in order to mix the analog audio signal and the digital audio signal.

SUMMARY

Accordingly, the disclosure provides an audio mixing device and method. The disclosure enables mixing of the analog audio signal, the digital audio signal and the disclosure uses only one down sample filter to process an analog audio signal and/or a digital audio signal of a digital microphone, thereby reducing circuit cost. Therefore, the disclosure better meets the requirements for applications of an audio codec by the user.

The disclosure provides an audio mixing device, including: an ADC, a converting module, a mixing module, and a down sample filter. The ADC is adapted to receive an analog signal, and convert the analog signal into a first digital signal. The converting module receives a second digital signal, and adjusts a data rate of the second digital signal according to a data rate of the first digital signal to generate a third digital signal. The mixing module aggregates the first digital signal and the third digital signal to output a mixed signal. The down sample filter down-samples the mixed signal to output a down-sampled signal.

The disclosure also provides an audio mixing method, including the following steps: receiving an analog signal, and converting the analog signal into a first digital signal; receiving a second digital signal; adjusting a data rate of the second digital signal according to a data rate of the first digital signal to generate a third digital signal; aggregating the first digital signal and the third digital signal to generate a mixed signal; and down-sampling the mixed signal to output a down-sampled signal.

The preferred embodiments and efficacies of the disclosure are described below with reference to the accompanying drawings.

BRIEF DESCRIPTION OF THE DRAWINGS

The disclosure will become more fully understood from the detailed description given herein below, which is for purposes of illustration only and thus not limitative of the disclosure, wherein.

DETAILED DESCRIPTION

The disclosure provides an audio mixing device and method, so as to process an analog audio signal and a digital audio signal simultaneously. The device and method have a function of outputting a down-sampled signal.

Figure 1:
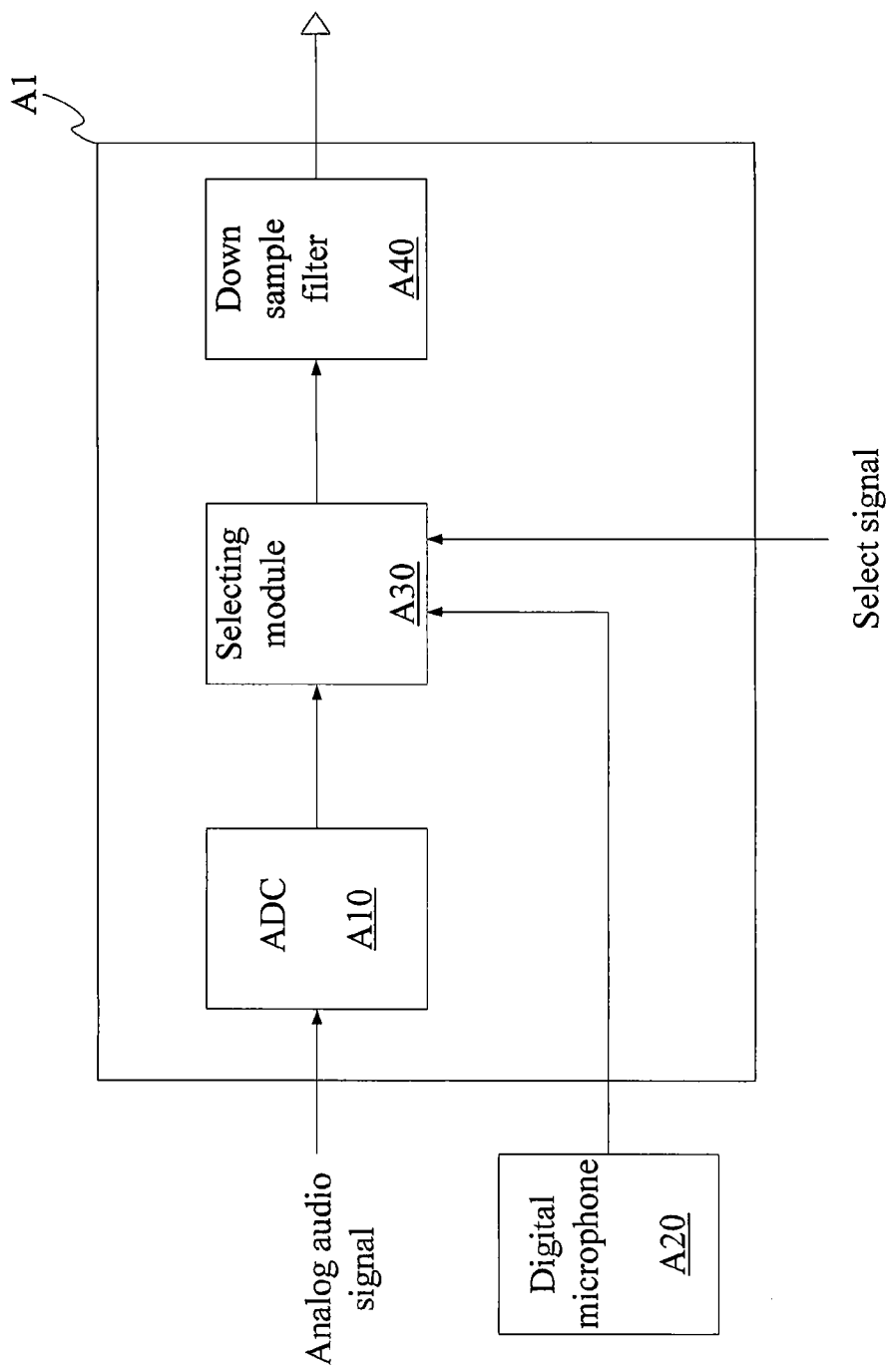
FIG. 1 is a schematic view of a conventional audio codec.
Figure 2:
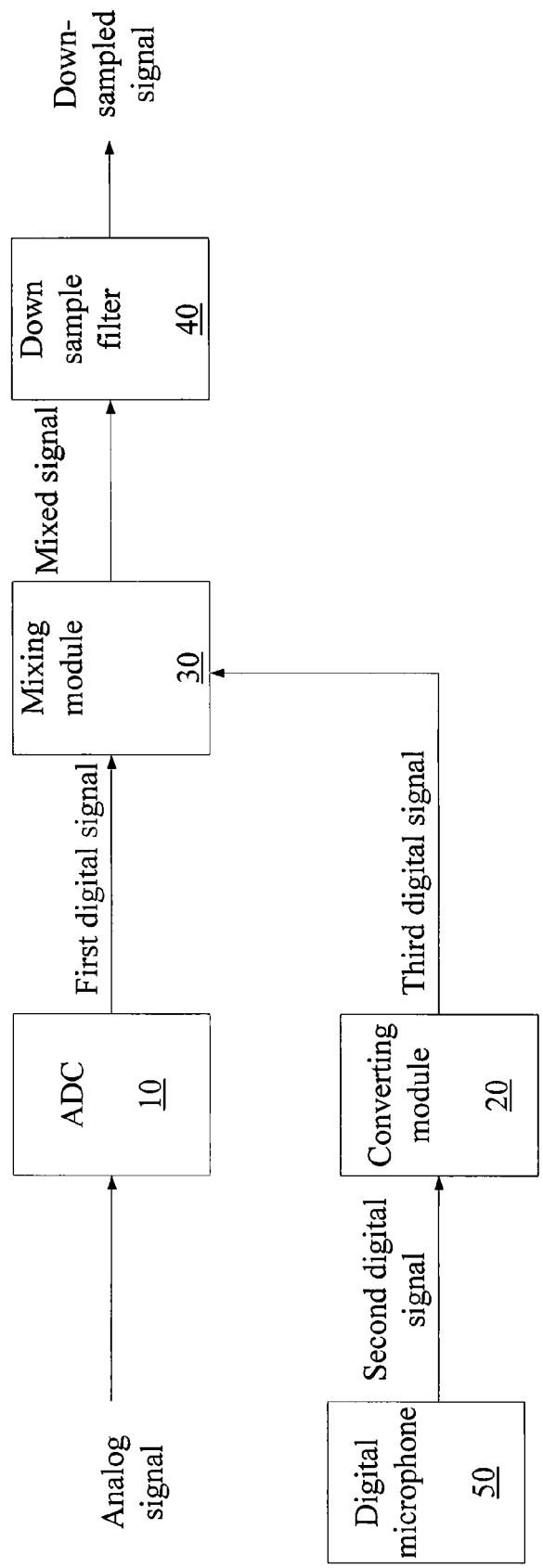
FIG. 2 is a schematic view of an audio mixing device according to an embodiment of the disclosure.

FIG. 2 is a schematic view of an audio mixing device according to an embodiment of the disclosure. The audio mixing device includes: an ADC 10, a converting module 20, a mixing module 30, and a down sample filter 40.

When mixing of two different signals is needed, if data rates of the two audio signals are the same the mixing is easy and the mixing effect is better. At first, the ADC 10 receives an analog signal and converts the analog signal into a first digital signal. The second digital signal will be mixed with the first digital signal generated by the ADC, so the data rate of the second digital signal must be adjusted before the subsequent mixing.

The converting module 20 is adapted to adjust the data rate of the digital signal. Here, the converting module 20 receives the second digital signal from the digital microphone 50, and converts the data rate of the second digital signal, so that the data rate of the second digital signal is consistent with the data rate of the first digital signal. The second digital signal converted by the converting module 20 is referred to as a third digital signal. The second digital signal may be provided by the digital microphone 50, which is built-in in the ADC. Thus after the digital microphone receives the (analog) audio signal, the (analog) audio signal can be converted into the digital audio signal (that is, the second digital signal), by the built-in ADC.

After the converting module 20 converts the data rate of the second digital signal so it is the same as that of the first digital signal, the two signals are aggregated, and the mixing effect is better. The mixing module 30 aggregates the first digital signal and the third digital signal to output a mixed signal. At this point the aggregation of the analog signal and the digital signal is completed. Finally, the down sample filter 40 down-samples the mixed signal generated by the mixing module 30 to output the down-sampled signal. Here, the down-sampled signal output by the down sample filter 40 is a mixture of the analog signal and the digital signal, and the down-sampled signal output at last can be provided to a subsequent stage device (such as a personal computer), for subsequent audio processing.

Figure 3:
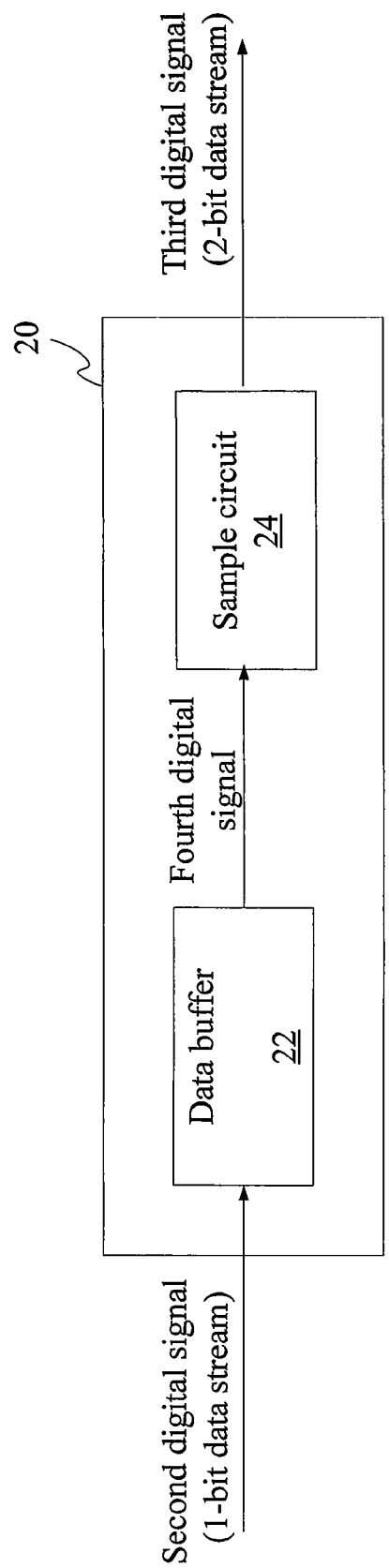
FIG. 3 is a schematic view of a converting module according to an embodiment of the disclosure.

FIG. 3 is a schematic view of the converting module 20 according to an embodiment of the disclosure. Here, the converting module 20 may include a buffer 22 and a sample circuit (or sample-and-hold circuit) 24.

Referring to FIGS. 3 and 2, the second digital signal provided by the digital microphone 50 may be a 1-bit data stream. In this embodiment the data is in one of only two states, either a logic 0 (GND) or a logic 1 (VDD), representing values −1 and +1 respectively. Because the second digital signal provided by the digital microphone is 1-bit data stream, the DC value of the second digital signal is not 0. That is, the second digital signal has a DC offset.

The disclosure uses the buffer 22 to receive the second digital signal. Here, the buffer 22 may be a first-in-first-out (FIFO) buffer, so as to generate a fourth digital signal in a FIFO mode. In this way, the problem of a synchronism between the second digital signal and the first digital signal can be solved. Furthermore, the buffer 22 also may be omitted according to the actual situation.

After the second digital signal is processed by the buffer 22, the generated fourth digital signal is transmitted to the sample circuit 24. Please refer to FIG. 2. In this embodiment the data rate of the first digital signal output by the ADC 10 is higher (or lower), and the data rate of the second digital signal provided by the digital microphone 50 is relatively lower (or higher); therefore, the fourth digital signal processed by the buffer 22 must pass the sample circuit 24 to adjust the data rate thereof.

An example is given below to illustrate the adjusting method. It is assumed that the data rate of the first digital signal is 128 f(S) (frequency of sampling), and the data rate of the second digital signal is 64 f(S), the former is twice of the latter. Therefore, the sample circuit 24 must double the sampling of the fourth digital signal to increase 64 f(S) to 128 f(S), that is, to the data rate of the first digital signal. In order to prevent the signal distortion caused by the increase of the data rate of the fourth digital signal, the sampling is doubled, but the previous piece of data is held. As the data rate of the signal is adjusted by way of sampling and holding, the sample circuit 24 can be used. The fourth digital signal can be converted into the third digital signal after being processed by the sample circuit 24. The third digital signal may be a 2-bit data stream. Here, the values used in this embodiment are represented by way of a 2's complement representation, so logic 0 (value −1) and logic 1 (value +1) are converted into 11 and 01 respectively, and are represented by 2-bit data such that the DC value of the third digital signal can be 0.

Figure 4:
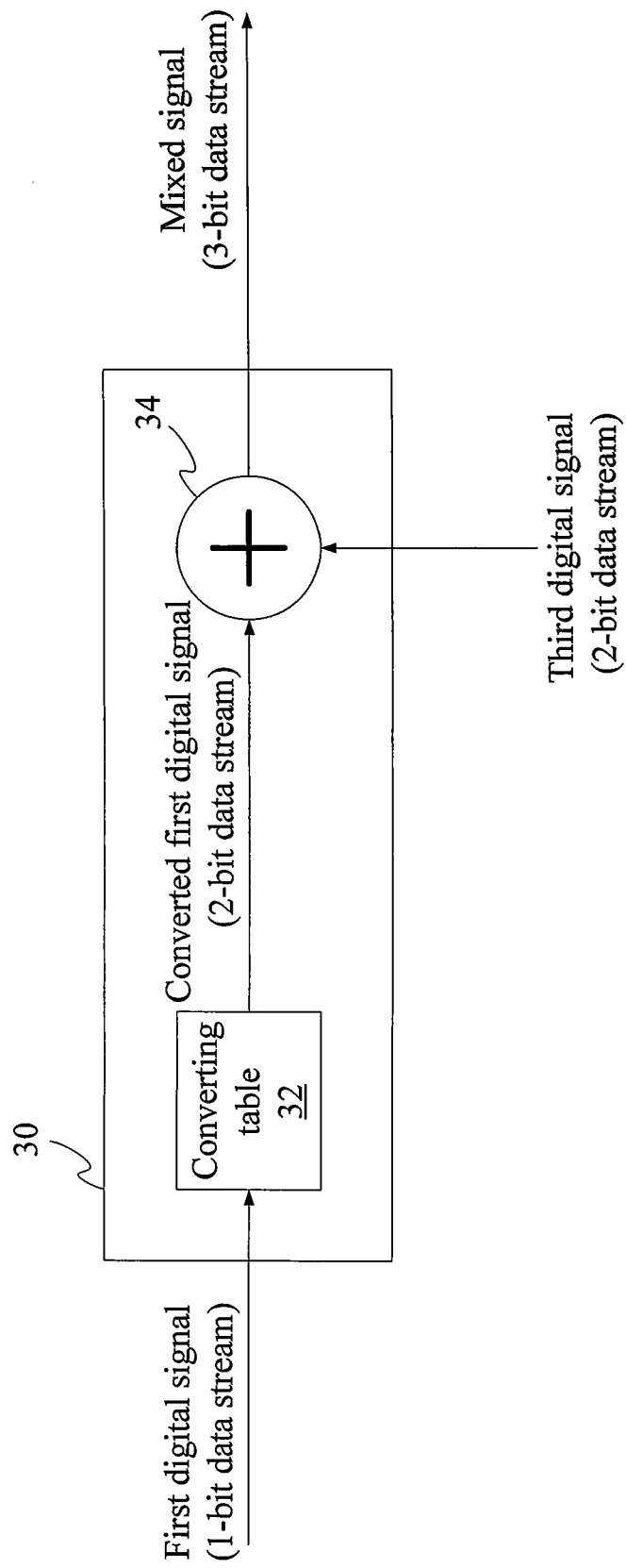
FIG. 4 is a schematic view of a mixing module according to an embodiment of the disclosure.

FIG. 4 is a schematic view of an embodiment of a mixing module. Here, the mixing module 30 may include: a converting table 32 and an adder 34.

For example, an analog signal is converted into a first digital signal by the ADC 10, and the first digital signal may be a 1-bit data stream. By contrast, the third digital signal may be a 2-bit data stream. Therefore, before the first digital signal and the third digital signal are added, the first digital signal needs to be converted into a 2-bit data stream to facilitate the subsequent adding. Here, the converting table 32 is adapted to convert the number of bits of the data stream of the first digital signal, such that the number of bits of the data stream of the first digital signal is consistent with the number of bits of the data stream of the third digital signal. Taking the above description as an example, the 1-bit data stream of the first digital signal is converted into a 2-bit data stream. After the first digital signal is converted by the converting table 32, the generated signal is referred to as the converted first digital signal. Furthermore, the converting table 32 may be omitted according to the actual situation.

Finally, the adder 34 adds the converted first digital signal and the third digital signal to output a mixed signal. The converted first digital signal is a 2-bit data stream, and the third digital signal is also a 2-bit data stream; therefore, the result of adding the two signals are represented by a 3-bit data stream (that is, the mixed signal), is a 3-bit data stream.

Figure 5:
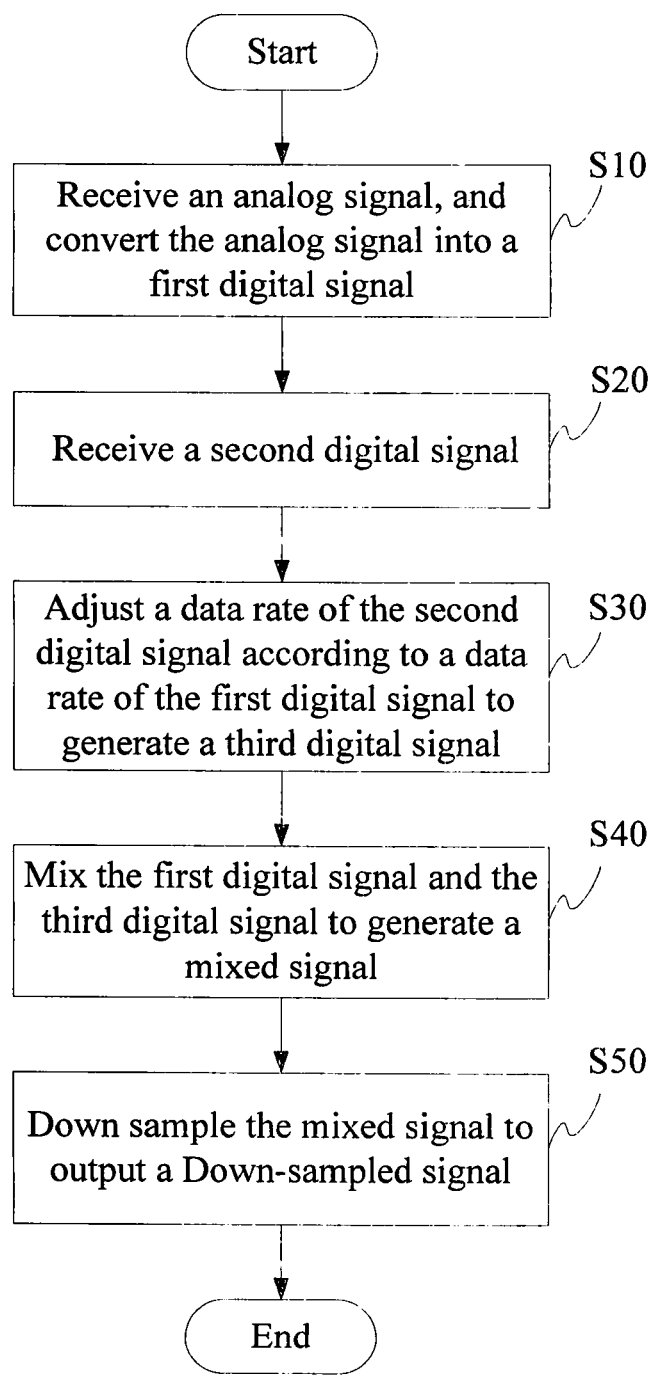
FIG. 5 is a flow chart of an audio mixing method.

FIG. 5 is a flow chart of an audio mixing method. Referring to FIG. 5, the method includes the following steps.

In step S10, an analog signal is received, and the analog signal is converted into a first digital signal. The first digital signal may be an M-bit data stream. In an embodiment, M=1.

In step S20, a second digital signal is received. The second digital signal is provided by a digital microphone. In addition, the second digital signal may be an N-bit data stream. In an embodiment, N=1.

In step S30, a data rate of the second digital signal is adjusted according to a data rate of the first digital signal to generate a third digital signal. In addition, a bit number of the second digital signal is adjusted. In an embodiment, the third digital signal is a 2-bit data stream and the DC value of the third digital signal can be 0. The data rate of the second digital signal may be adjusted by way of sampling and holding. In a preferred embodiment, the data rate of the third digital signal is substantially the same as the data rate of the first digital signal.

Step S30 may further include the following steps: the second digital signal is buffered, and a fourth digital signal is generated in a FIFO mode; a data rate of the fourth digital signal is adjusted according to the data rate of the first digital signal to generate the third digital signal. The data rate of the fourth digital signal may be adjusted by way of sampling and holding.

In step S40, the first digital signal and the third digital signal are aggregated to generate a mixed signal. In an embodiment, the mixed signal may include a plurality of 3-bit data streams.

In step S50, the aggregation is down-sampled to output a down-sampled signal.

It is discernable from the above description that the audio mixing device and method provided by the disclosure may be applied to an audio codec to achieve the function of mixing the analog audio signal and the digital audio signal. Compared with the prior art, which can only select for processing one of the analog audio signal and the digital audio signal, the disclosure provides a more flexible application.

What is claimed is:

1. An audio mixing device, comprising:
   an analog to digital converter (ADC), for receiving an analog signal, and converting the analog signal into a first digital signal;
   a converting module, for receiving a second digital signal, and adjusting a data rate of the second digital signal according to a data rate of the first digital signal to generate a third digital signal;
   a mixing module, for converting the first digital signal into a converted first digital signal compatible with the third digital signal and mixing the converted first digital signal and the third digital signal to output a mixed signal; and
   a down sample filter, for down-sampling the mixed signal to output a down-sampled signal; wherein, the second digital signal is a 1-bit data stream and wherein the third digital signal is a 2-bit data stream.

2. The device of claim 1, wherein a data rate of the third digital signal is substantially the same as the data rate of the first digital signal.

3. The device of claim 1, wherein the data rate of the second digital signal is adjusted by way of sampling.

4. The device of claim 1, wherein the converting module further comprises: a buffer, for receiving the second digital signal, and generating a fourth digital signal; and a sample circuit, for receiving the fourth digital signal and adjusting a data rate of the fourth digital signal according to the data rate of the first digital signal to generate the third digital signal.

5. The device of claim 4, wherein the buffer is a first-in-first-out (FIFO) buffer.

6. The device of claim 1, wherein the mixing module further comprises an adder.

7. The device of claim 6, wherein the first digital signal is converted by applying a converting table.

8. The device of claim 1, wherein the second digital signal is provided by a digital microphone.

9. The device of claim 1, wherein the first digital signal is a 1-bit data stream.

10. The device of claim 1, wherein the mixed signal is a 3-bit data stream.

11. The device of claim 1, wherein a DC value of the second digital signal is not 0 and a DC value of the mixed signal is approximately 0.

12. An audio mixing method, comprising:
    converting an analog signal into a first digital signal;
    receiving a second digital signal;
    adjusting a data rate of the second digital signal according to a data rate of the first digital signal to generate a third digital signal;
    mixing the first digital signal and the third digital signal to generate a mixed signal, wherein mixing comprises converting the first digital signal into a converted first digital signal compatible with the third digital signal; and
    down-sampling the mixed signal to output a down-sampled signal; wherein, the second digital signal is a 1-bit data stream and wherein the third digital signal is a 2-bit data stream.

13. The method of claim 12, wherein a data rate of the third digital signal is substantially the same as the data rate of the first digital signal.

14. The method of claim 12, wherein the data rate of the second digital signal is adjusted by way of sampling.

15. The method of claim 12, wherein the second digital signal is provided by a digital microphone.

16. The method of claim 12, wherein a DC value of the second digital signal is not 0 and a DC value of the mixed signal is approximately 0.

17. The method of claim 12, wherein, the step of generating the mixed signal further comprises: adding the first digital signal and the third digital signal to output the mixed signal.

18. The method of claim 12, wherein, the step of generating the mixed signal further comprises:
    adding the converted digital signal and the third digital signal to output the mixed signal.

19. An audio mixing device, comprising:
    an analog to digital converter (ADC), for receiving an analog signal, and converting the analog signal into a first digital signal;
    a converting module, for receiving a second digital signal, and adjusting a data rate of the second digital signal according to a data rate of the first digital signal to generate a third digital signal;
    a mixing module, for converting the first digital signal into a converted first digital signal compatible with the third digital signal and mixing the converted first digital signal and the third digital signal to output a mixed signal; and
    a down sample filter, for down-sampling the mixed signal to output a down-sampled signal; wherein, the second digital signal is a 1-bit data stream and wherein the mixed signal is a 3-bit data stream.

20. An audio mixing method, comprising:
    converting an analog signal into a first digital signal;
    receiving a second digital signal;
    adjusting a data rate of the second digital signal according to a data rate of the first digital signal to generate a third digital signal;
    mixing the first digital signal and the third digital signal to generate a mixed signal, wherein mixing comprises converting the first digital signal into a converted first digital signal compatible with the third digital signal; and
    down-sampling the mixed signal to output a down-sampled signal; wherein, the second digital signal is a 1-bit data stream and wherein the mixed signal is a 3-bit data stream.

* * * * *